United States Patent
Goehring et al.

(10) Patent No.: US 6,394,209 B1
(45) Date of Patent: May 28, 2002

(54) MOTOR VEHICLE SERIAL HYBRID DRIVE FOR I.C. ENGINE OPERATED ONLY AT OR NEAR FULL LOAD

(75) Inventors: Markus Goehring, Herrenberg; Adolf Kuenzer, Remshalden; Karl Ernst Noreikat, Esslingen, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 08/912,689

(22) Filed: Aug. 18, 1997

(30) Foreign Application Priority Data

Aug. 17, 1996 (DE) .......................... 196 33 194

(51) Int. Cl.[7] .............................. B60L 11/02
(52) U.S. Cl. ..................................... 180/65.4
(58) Field of Search ............... 180/65.2, 65.3, 180/65.4; 60/698; 318/139

(56) References Cited

U.S. PATENT DOCUMENTS

| | | | |
|---|---|---|---|
| 3,992,885 A | * 11/1976 | Forster | 60/698 |
| 5,318,142 A | 6/1994 | Bates et al. | |
| 5,323,868 A | * 6/1994 | Kawashima | 180/65.4 |
| 5,345,154 A | 9/1994 | King | |
| 5,345,761 A | * 9/1994 | King et al. | 180/65.3 |
| 5,346,031 A | * 9/1994 | Gardner | 180/65.4 |
| 5,415,245 A | * 5/1995 | Hammond | 180/65.4 |
| 5,428,274 A | * 6/1995 | Furutani | 318/139 |
| 5,588,498 A | * 12/1996 | Kitada | 180/65.4 |
| 5,786,640 A | * 7/1998 | Sakai et al. | 180/65.2 |

FOREIGN PATENT DOCUMENTS

| | | |
|---|---|---|
| DE | 4133013 A1 | 4/1993 |
| EP | 0437266 A2 | 7/1991 |
| EP | 0 460 580 A2 | 12/1991 |
| EP | 0 570 242 A1 | 11/1993 |
| SU | 907-279 * 2/1982 | ............ 60/698 |
| WO | WO 95/31855 | 11/1995 |

* cited by examiner

*Primary Examiner*—Frank Vanaman
(74) *Attorney, Agent, or Firm*—Crowell & Moring LLP

(57) ABSTRACT

A serial hybrid drive has an internal combustion engine, a generator coupled mechanically to the internal combustion engine, an energy store coupled electrically to the generator, and at least one electric drive motor electrically connected to the generator and the energy store. The internal combustion engine/generator unit is operated along an operating characteristic whose power corresponds to the temporally smoothed power requirement of the electric drive motor, and the internal combustion engine is always operated at or near full load. In such case, the energy store has an energy storage capacity of at most a few kilowatt hours and a high power density, and compensates for the short-term power differences between the instantaneous power requirement of the electric drive motor and the power output by the internal combustion engine/generator unit and corresponding to the temporally smoothed power requirement of the electric drive motor.

6 Claims, 1 Drawing Sheet

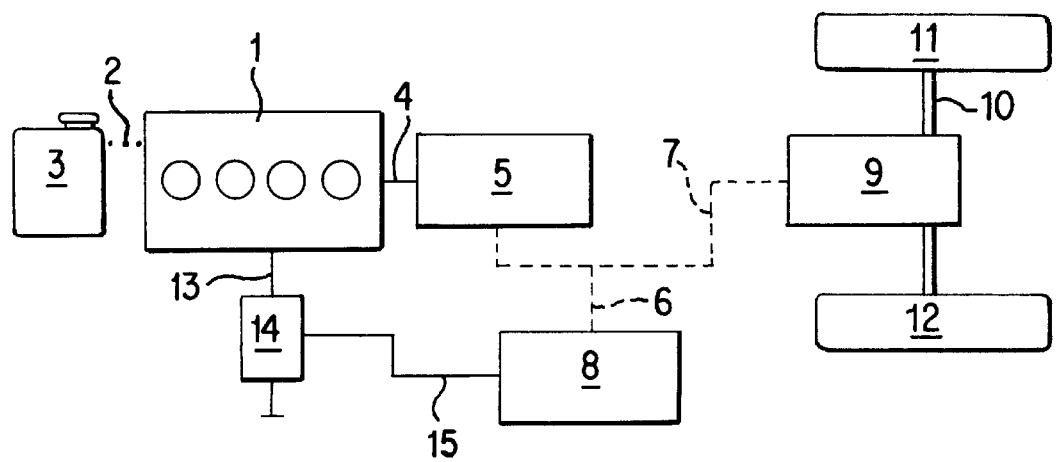

MOTOR VEHICLE SERIAL HYBRID DRIVE FOR I.C. ENGINE OPERATED ONLY AT OR NEAR FULL LOAD

BACKGROUND AND SUMMARY OF THE INVENTION

This application claims the priority of 196 33 194.3, the disclosure of which is expressly incorporated by reference herein.

The present invention relates to a serial hybrid drive which can be used, in particular, in motor vehicles. In such hybrid drives, one or more electric drive motors make mechanical drive power available, for example for driving the drive wheels using the motor vehicle. The required driving energy is generated by the internal combustion engine/generator unit and, depending on the operating phase, fed directly to the electric drive motors or buffered in the energy store.

In most conventional motor vehicle serial hybrid drives, driving during specific operating phases, for example urban driving, occurs for minutes or hours using only the energy previously stored in the energy store, with the internal combustion engine remaining switched off. In order to provide such driving conditions, energy stores are used which have a relatively high storage capacity of, typically, more than ten kilowatt hours.

Laid-open Application EP 0 437 266 A2 describes a motor vehicle with serial hybrid drive in which the internal combustion engine/generator unit is controlled as a function of the load situation of the energy store and/or of the power output situation of the electric drive motor, for which purpose different variants are proposed. In a first known variant, the internal combustion engine is operated in a type of two-point operation optionally at a power speed selected with optimization in view, or at an idling speed.

In a second variant, the internal combustion engine is controlled to a higher or lower output power, and thus is approximately matched to the vehicle power requirement. In this case, the internal combustion engine is intended to run for as long as possible at or near its operating point of optimum consumption, with a fluctuation preferably of at most 10% being permitted.

In yet a third variant, the electric power output by the generator is controlled, and this represents a continuous matching of the generator power to the power output situation of the electric motor. In the two last-named variants, the internal combustion engine is preferably assigned a controller which selects for the respectively required internal combustion engine power a speed/torque combination which is as favorable as possible with regard to fuel consumption and/or pollutant emission. The remaining energy fluctuations are compensated in each case by the energy store, which is designed as a flywheel store.

DE 41 33 013 A1 discloses serial hybrid drives of which have a flywheel or accumulator for storing electric energy. Electric energy is fed into the respective electric drive motor optionally from the internal combustion engine/generator unit and/or the energy store as a function of the fuel consumption, exhaust gas quality, noise emission and/or the loading of the assembly of the internal combustion engine as well as the charge state of the energy store. The optimum operating point of the internal combustion engine is set, to the extent possible, as that which lies in a middle power range of the internal combustion engine in which the engine has a high efficiency.

In the event of a power requirement for the electric drive motor which has been increased in the short term, the internal combustion engine remains unchanged in its previous operating state, and the additional energy for the electric motor is made available by the energy store. If the increased power requirement of the electric drive motor lasts longer than the time interval variably prescribed, for example, by the charge state of the store, the internal combustion engine is accelerated in the conventional way by customary engine control measures.

An object of the present invention is to provide a serial hybrid drive which can be realized with a comparatively low outlay and permits the vehicle to be operated with as little pollution as possible.

The foregoing object has been achieved in accordance with the present invention by providing a serial hybrid drive having an internal combustion engine, a generator coupled mechanically to the internal combustion engine, an energy store coupled electrically to the generator, and at least one electric drive motor electrically connected to the generator and the energy store, characterized in that the internal combustion engine/generator unit is operated along an operating characteristic whose power corresponds to the temporally smoothed power requirement of the electric drive motor, the engine always being operated at or near full load, and the energy store has an energy storage capacity of at most a few kilowatt hours and a high power density and serves the purpose of compensating the short-term power differences between the instantaneous power requirement of the electric drive motor and the power output by the internal combustion engine/generator unit and corresponding to the temporally smoothed power requirement of the electric drive motor.

In the hybrid drive according to the present invention, the internal combustion engine/generator unit is always operated along an operating characteristic whose power corresponds to the temporally smoothed power requirement of the electric drive motor. The internal combustion engine always operated at or near full load and thus in a manner which is very low in pollutants and favorable in terms of consumption.

The recognition that the operating characteristic for controlling the operation of the internal combustion engine/generator unit should be based, not directly on the power requirement curve of the electric drive motor, but on its curve as smoothed temporally in accordance with any one of the customary methods produces the significant advantage that there are no short-term sudden power variations in the operation of the internal combustion engine. Instead, the I.C. engine is subjected only to slow temporal changes, with the result that the engine produces minimum pollutant emissions, i.e. the engine can be operated in accordance with the temporally smoothed drive power requirement.

The "calmed" internal combustion engine operation, in which there are no sudden changes in throttle valve angle, prevents peak values in HC concentration and CO concentration in the exhaust gas. By comparison with conventional vehicle drives, this operation effects a markedly more precise adherence to the stoichiometric air/fuel ratio so as to improve the rate at which the catalytic converter operates.

The internal combustion engine can be operated in the engine operating map area which is most favorable in terms of emission, and the calmed engine operation in the restricted engine operating map areas keeps the exhaust gas temperature window small and avoids peak values in the exhaust gas temperature. All of this benefits both the rate at which the catalytic converter operates and its durability.

The short-term power differences occurring between the instantaneous power requirement of the electric drive motor and the calmed power output of the internal combustion engine/generator unit are compensated by the energy store which, for this purpose, has a high power density. The energy store is sized in terms of its storage capacity to at most a few kilowatt hours, and is thus has a substantially lower capacity than conventional hybrid drive stores. Consequently, the energy store can be very compact and can be realized, for example, as a flywheel or super-condenser. Thereby, the energy store has a storage capacity of at most a few hundred watt hours.

In a serial hybrid drive developed according to the present invention, internal combustion engine is operated exclusively at full load. The instantaneous operating point is set on the full-load characteristic as a function of the generator load. This mode of operation allows the internal combustion engine to be used as a spark-ignition engine which has no throttle valve with associated controller. The internal combustion engine can therefore be realized in a comparatively simple and cost-effective way.

Because of the lack of throttle valve movements achievable with the present invention, the stoichiometric air/fuel ratio can be observed precisely at any time. Consequently, short-term peaks in pollutant emission and associated drops in the efficiency of the catalytic converter can be prevented. The internal combustion engine gains optimum efficiency because of being completely without a throttle valve, and is operated with favorable HC raw emissions. Thereby other, conventional measures such as direct injection or completely variable valve gear are unnecessary for this purpose.

A serial hybrid drive developed according to another aspect of the present invention, includes a catalytic converter which is heated electrically before the cold start of the internal combustion engine by the energy from the energy store which, with its high power density, is ideally suitable for very quick heating of the catalytic converter.

BRIEF DESCRIPTION OF THE DRAWING

Other objects, advantages and novel features of the present invention will become apparent from the following detailed description of the invention when considered in conjunction with the sole FIGURE. The single FIGURE is a schematic diagram of a serial hybrid drive used in a motor vehicle.

DETAILED DESCRIPTION OF THE DRAWING

The serial hybrid drive shown has an internal combustion engine 1, which can be operated via a fuel line 2 by fuel stored in a tank 3. A generator 5 is coupled mechanically via a shaft 4 to the internal combustion engine 1. An energy store 8 and an electric drive motor 9 are connected in parallel to the electrical generator output via associated connecting lines 6, 7. The mechanical output of the electric drive motor 9 acts on a drive axle 10 with coupled vehicle drive wheels 11, 12.

The exhaust gas from the internal combustion engine is removed via an exhaust gas section 13 in which an exhaust gas catalytic converter 14 is located and can be heated by the energy store 8 via a heating line 15. The energy store 8 is sized as a small store with a storage capacity of approximately 100 Wh, but a high power density. It can, in particular, be realized as a flywheel or as a supercondenser.

The internal combustion engine 1 is implemented as an engine without a throttle valve and thus also without an associated throttle valve controller. In operation, it is therefore operated exclusively directly on its full load characteristic. Owing to the elimination of the throttle valve together with the associated controller, the internal combustion engine 1 can be comparatively simple and cost-effective. Because the engine is operated completely without a throttle valve, it runs optimally in terms of efficiency and with low pollutant emissions, in particular HC emissions. In addition, there is no problem in precisely observing the stoichiometric air/fuel ratio at any time, with the result that there are no short-term peaks in pollutant emission or drops in the efficiency of the catalytic converter.

The instantaneous operating point on the full load characteristic, i.e. the instantaneous desired power for the internal combustion engine 1, is set in conjunction with stipulating the associated full load characteristic. That is, the torque/speed characteristic without throttling is purely a function of the generator load. This control of the internal combustion engine/generator unit 1, 4, 5 is suitable both for operating phases in which the motor is operated in a steady state at specific points on the engine operating map, and for dynamic engine operating phases. Where a very low power requirement is demanded on the electric drive motor 9, the internal combustion engine/generator unit 1, 4, 5 can be switched off. Thereby, the required driving energy can be extracted purely from the energy store 8. Because the motor 1 is operated exclusively at full load, it can be tuned specifically to this type of operation. Alternatively, a conventional internal combustion engine 1 with a throttle valve can be used and, consequently, with the ability to control the load. In this alternative embodiment, the internal combustion engine 1 is normally operated in its engine operating map on a characteristic at or near the full load.

Controlling the internal combustion engine/generator unit 1, 4, 5 on the operating characteristic at or near the full load characteristic is determined by the power requirement of the electric drive motor 9. In this case, it is not the instantaneous power requirement of the electric drive motor 9 which is used directly as a measure for the control, but a temporally smoothed power requirement signal which is obtained therefrom by a suitable, conventional smoothing method. Thereby, the power demanded by the internal combustion engine/generator unit 1, 4, 5 corresponds to the temporally smoothed power requirement of the electric drive motor 9. This avoids the occurrence of sudden power variations for the internal combustion engine 1, and results in a temporally smoothed power matching for the latter without sudden changes in the throttle valve angle. Owing to this calmed operation of the internal combustion engine, peak values in the HC concentration and CO concentration of the engine exhaust gas can be avoided.

Moreover, the stoichiometric air/fuel ratio can be observed very precisely. This permits the catalytic converter to operate at high rates. The calmed operation of the internal combustion engine in a limited engine operating map area near full load keeps the fluctuations in exhaust gas temperature low and avoids peaks in exhaust gas temperatures. This benefits not only the rate of operation of the catalytic converter but also the durability of the catalytic converter.

In continuous driving operation, the energy store 8 compensates for the occurring short-term power differences between the instantaneous power requirement of the electric drive motor 9 and the power which is output instantaneously by the internal combustion engine/generator unit 1, 4, 5 and corresponds to the temporally smoothed electric drive motor power requirement. For such purpose, the energy store 8 is suitable because of its high power density without the need for a high energy storage capacity. The buffering of only a comparatively low amount of energy in the energy store 8 results in a high efficiency of the entire drive train without the occurrence of appreciable extra emissions of exhaust gas pollutants because of dispensing with operating the internal combustion engine in the purely steady state.

A further advantage of the lower energy storage capacity according to the present invention as compared with conventional hybrid drive systems having traction batteries of large dimensions results in the energy store 8 being of lower weight, thereby keeping the vehicle weight low. The high energy density of the energy store 8 is suitable, moreover, for realizing regenerative braking with relatively high efficiency.

A further use of the energy store 8 is to heat the catalytic converter 14 before cold starting the internal combustion engine 1. The high power density of the energy store 8 is ideally suitable for very fast heating of the catalytic converter.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A serial hybrid drive, comprising
   an internal combustion engine operated substantially at a full load characteristic;
   a generator mechanically coupled to said internal combustion engine;
   an energy store electrically coupled to said generator wherein said energy store has a storage capacity less than 10 kw hours and a high power density;
   at least one electric drive motor electrically connected to said generator and to said energy store;
   wherein a time-smoothed power requirement of the at least one electric drive motor is determined as a function of a determined power requirement of the electric drive motor; wherein an output of the generator is determined and is adjusted as a function of the time-smoothed power requirement of the electric motor; and wherein the power of said internal combustion engine is determined and is adjusted as a function of the power of said generator using said full load characteristic wherein the energy store compensates for a short-term power difference between a current power requirement of the electric drive motor and the power of said internal combustion engine and generator unit which corresponds to the time-smoothed power requirement of the electric drive motor.

2. The serial hybrid drive according to claim 1, wherein an instantaneous operating point of the engine is set on a full-load characteristic as a function of generator load.

3. The serial hybrid drive according to claim 2, wherein the internal combustion engine is a throttle-valveless spark-ignition engine having an operating point set exclusively via the generator load.

4. The serial hybrid drive according to claim 1, wherein an exhaust gas catalytic converter is arranged in an exhaust gas section of the internal combustion engine and is arranged to be heated electrically via the energy store.

5. The serial hybrid drive according to claim 4, wherein an instantaneous operating point of the engine is set on a full-load characteristic as a function of generator load.

6. The serial hybrid drive according to claim 5, wherein the internal combustion engine is a throttle-valveless spark-ignition engine having an operating point set exclusively via the generator load.

* * * * *